United States Patent [19]

Jitaru

[11] Patent Number: 5,231,563
[45] Date of Patent: Jul. 27, 1993

[54] SQUARE WAVE CONVERTER HAVING AN IMPROVED ZERO VOLTAGE SWITCHING OPERATION

[75] Inventor: Ionel Jitaru, Tucson, Ariz.

[73] Assignee: ITT Corporation, Secaucus, N.J.

[21] Appl. No.: 868,924

[22] Filed: Apr. 15, 1992

Related U.S. Application Data

[63] Continuation-in-part of Ser. No. 579,470, Sep. 7, 1990, Pat. No. 5,126,931.

[51] Int. Cl.$^5$ ............................................. H02M 7/521
[52] U.S. Cl. ....................................... 363/98; 363/17; 363/132
[58] Field of Search ............................ 363/17, 98, 132

[56] References Cited

U.S. PATENT DOCUMENTS

| | | | |
|---|---|---|---|
| 3,582,758 | 6/1971 | Gunn | 363/127 |
| 3,909,700 | 9/1975 | Ferro | 363/127 |
| 3,940,682 | 2/1976 | Park et al. | 363/127 |
| 4,146,832 | 3/1979 | McConnell | 323/17 |
| 4,246,634 | 1/1981 | Purol | 363/49 |
| 4,319,316 | 3/1982 | Farrer et al. | 363/132 |
| 4,323,962 | 4/1982 | Steigerwald | 363/127 |
| 4,386,394 | 5/1983 | Kocher et al. | 363/20 |
| 4,399,376 | 8/1983 | Onodera et al. | 363/20 |
| 4,415,959 | 11/1983 | Vinciarelli | 363/21 |
| 4,417,153 | 11/1983 | Onodera et al. | 363/20 |
| 4,441,146 | 4/1984 | Vinciarelli | 363/20 |
| 4,451,876 | 5/1984 | Ogata | 363/91 |
| 4,519,024 | 5/1985 | Federico et al. | 363/127 |
| 4,586,118 | 4/1986 | Mihalka | 363/17 |
| 4,628,426 | 12/1986 | Steigerwald | 363/98 |
| 4,642,743 | 2/1987 | Radcliffe | 363/97 |
| 4,648,020 | 3/1987 | Vinciarelli | 363/71 |
| 4,675,797 | 6/1987 | Vinciarelli | 363/21 |
| 4,677,534 | 6/1987 | Okuchi | 363/21 |
| 4,680,687 | 7/1987 | Stasch et al. | 363/18 |
| 4,709,316 | 11/1987 | Ngo et al. | 363/21 |
| 4,716,514 | 12/1987 | Patel | 363/127 |
| 4,760,512 | 7/1988 | Loftus | 363/20 |
| 4,809,148 | 2/1989 | Barn | 363/20 |
| 4,811,187 | 3/1989 | Nakajima et al. | 363/91 |
| 4,837,452 | 6/1989 | Peterson | 307/2 |
| 4,858,052 | 8/1989 | McDonnal | 361/18 |
| 4,864,479 | 9/1989 | Steigerwald et al. | 363/132 |
| 4,922,404 | 5/1990 | Ludwig et al. | 363/127 |
| 4,931,716 | 6/1990 | Jovanovic et al. | 323/285 |
| 4,931,920 | 6/1990 | Barker | 363/21 |
| 4,937,470 | 6/1990 | Zeiler | 323/289 |
| 4,959,764 | 9/1990 | Bassett | 363/20 |
| 4,975,821 | 12/1990 | Lethellier | 363/21 |
| 5,113,334 | 5/1992 | Tuscon et al. | 363/97 |
| 5,126,931 | 6/1992 | Jitaru | 363/97 |

FOREIGN PATENT DOCUMENTS

| | | |
|---|---|---|
| 0058400 | 2/1982 | European Pat. Off. . |
| 2608857 | 6/1988 | France . |
| WO83/02858 | 8/1983 | World Int. Prop. O. . |
| WO89/04082 | 5/1989 | World Int. Prop. O. . |

OTHER PUBLICATIONS

Lee; Zero-Voltage Switching Techniques in DC/DC Converter Circuits; Apr., 1987 HFPC Proceedin-s; pp. 15–40.

Tabisz, et al.; "Novel Zero-Voltage Switched Multi--Resonant Forward Converter", May 1988, HFPC Proceedings; pp. 309–317.

Primary Examiner—Steven L. Stephan
Assistant Examiner—Jeffrey Sterrett
Attorney, Agent, or Firm—Thomas L. Peterson

[57] ABSTRACT

An improved power converter utilizing a full wave or half wave bridge circuit is provided by capacitively decoupling the primary winding of the transformer, which is coupled to the output of the bridge circuit. The switches in the bridge are also driven in a complementary fashion so that all the switches are turned off during a constant dead time during which the switches are driven to zero voltage. Switches in the bridge circuit are then turned on only at zero voltage. Zero voltage switching is further provided over a wider range of input and output conditions by providing a third switch in series circuit with a secondary winding of the transformer, typically either in the form of a saturable reactor or a synchronized switch. Further circuit advantages are obtained by deleting any center tap on the secondary winding and providing output chokes in series circuit with each terminal of the secondary winding and coupled at their opposing ends to one terminal of the output of the secondary circuit.

20 Claims, 6 Drawing Sheets

SQUARE WAVE CONVERTER HAVING AN IMPROVED ZERO VOLTAGE SWITCHING OPERATION

RELATED CASE

The present application is a continuation in part of U.S. patent application Ser. No. 579,470, filed Sep. 7, 1990, entitled, "Fixed Frequency Single Ended Forward Converter Switching at Zero Voltage", now issued as U.S. Pat. No. 5,126,931 which is incorporated herein by reference.

BACKGROUND OF THE INVENTION

1. Field of the Invention

This invention relates to DC-DC, AC-DC, DC-AC and AC-AC power converters. Power is transferred in the circuit by using switches, which turn on under zero voltage conditions.

2. Description of the Prior Art

There is a continuous industry demand for increasing power density and efficiency in power converters. A method for increasing the power transfer through a converter is to increase the switching frequency in order to minimize the size of inductors and capacitors. However, in conventional square wave power conversion topologies, an increase in frequency means an increase in switching losses and of the electromagnetic interference (EMI) level. Several power conversion techniques were developed such as resonant and quasi-resonant topologies, which significantly decrease the switching losses. But these power conversion techniques bring their own set of problems, such as frequency modulation, large current or voltage stresses on the switching elements, and in some cases circulating currents, which affects the efficiency. As a result these topologies did not receive much acceptance from the power supply industry.

For high output power applications half bridge and full bridge converters are the most suitable. However, conventional half bridge and full bridge converters exhibit several shortcomings which makes them incompatible with very high frequency operation, especially in high input voltage applications. One of the problems associated with conventional half and full bridge converters is the switching losses, which are proportional with the operation frequency. Another shortcoming associated with conventional technologies is the fact that the leakage inductance of the transformer is not used or totally recycled. Most of the time the energy associated with the leakage inductance is dissipated in snubbing circuits. A hard switching technique, associated with conventional technology, leads to an increased level of EMI. General Electric has introduced a "new" full bridge zero voltage switching technology several years ago, known in industry as a "phase shifted full bridge converter". Unfortunately the control technique for this technology is very sophisticated and expensive. See, Steigerwald et al., "Full-Bridge Lossless Switching Converter," U.S. Pat. No. 4,864,479 (1989).

The half and full bridge converter which is the subject of this disclosure combines simplicity with the low cost and high performance. Zero voltage switching conditions are created for the switches, switching losses eliminated, and very high frequency operation allowed.

BRIEF SUMMARY OF THE INVENTION

The invention utilizes a the concept of complementary switches, where one of switches or set of switches conducts while another switch or set of switches is off. After a constant dead time when all the switches are off, the first switch or set of switches is off, and the second switch or set of switches turns on. During the constant dead time the voltage across the switch or switches swing to a zero voltage switching condition. As the duty cycle of the switches varies the dead time remains constant, therefore in the case of a full wave bridge, the duty cycle for one set of switches decreases in proportion to a corresponding increase in the other set of switches to keep the dead time constant in absolute magnitude. The dead time is chosen for the particular application to be sufficiently long to allow the switches to discharge to zero voltage as taught by the invention.

The control of this topology is simple and the zero voltage switching conditions allow operation at high frequency with no sacrifice of efficiency. There is no addition of supplementary components over the number in a traditional half and full bridge topology with the exception of a decoupling capacitor, which is used in any case in some full bridge configurations to prevent core saturation. Therefore, the major difference is the transfer function and the driving waveforms.

The invention can be more specifically summarized as follows. The invention is an improvement in a power converter bridge circuit having a power transformer with a primary winding and a secondary winding. The primary winding is coupled to a primary circuit. The secondary winding is coupled to a secondary circuit. The primary circuit comprises switches for switching current on and off through the primary winding. The secondary circuit is configured for coupling to a load. The improvement comprises a circuit for switching the switches in the primary circuit with complementary driving wave forms so that a constant dead time, when all the switches are turned off, is established and so that all of the switches switch at zero voltage. A decoupling capacitor is disposed in the primary circuit in series with the primary winding. The primary circuit forms a rectifying bridge so that the frequency of operation and power densities of the converter is substantially increased as compared to converter bridge circuits without the improvement. In one embodiment the bridge circuit is a full wave rectifying bridge. In another embodiment the rectifying circuit is a half wave rectifying bridge.

In the embodiment where a the full wave bridge is used, the bridge has input terminals and output terminals. The decoupling capacitor is coupled in series with the primary winding of the transformer. The series combination of the primary winding and decoupling capacitor is coupled across the output terminals of the full wave bridge.

The improvement further comprises a circuit for increasing magnetizing current within the primary winding of the transformer to guarantee zero voltage switching conditions of the switches in the primary circuit for an increased range of input and output conditions of the converter.

The improvement also further comprises a circuit for increasing leakage inductance of the primary winding of the transformer to guarantee zero voltage switching conditions of the switches in the primary circuit for an increased range of input and output conditions.

The improvement further comprises a switching circuit disposed in the secondary circuit to guarantee zero voltage switching conditions in the primary circuit for an increased range of input and output conditions.

In one embodiment the transformer has a center tap and an inductive choke in series circuit in the secondary circuit with the load. The secondary circuit comprises two output chokes coupled in series circuit with the secondary winding of the transformer. Opposing ends of the output chokes are coupled in common to the output of the secondary circuit. The secondary winding is without any center tap.

In still another embodiment the switching circuit is a saturable reactor. The switching circuit may also be a synchronized switch.

The improvement further comprises an inductor in series circuit with the decoupling capacitor in the primary circuit to guarantee zero voltage switching of the switches in the primary circuit over an increased range of input and output conditions.

The invention is also characterized as an improvement in a method for providing bridge rectification in a power circuit including a bridge rectifier coupled to a primary coil of a transformer. The transformer has a secondary coil coupled to a secondary circuit for coupling to a load. The improvement comprises the steps of driving the switches in the bridge with complementary timing so that there is a dead time during which all switches within the primary circuit are turned off, and simultaneously capacitively decoupling the primary coil from the bridge.

The improvement further comprises the step of switching each of the switches in the primary circuit at zero voltage.

The step of switching comprises the step of blocking flow of current in the secondary circuit coupled to secondary coil of the transformer through the primary circuit by inhibiting the loss of magnetizing energy from the primary coil until capacitance of the switches in the primary circuit have been discharged by the magnetizing energy in the primary coil.

The step of switching further comprises the step of providing an increased inductance in the primary coil of the transformer to increase magnetizing inductance and leakage inductance therein for the purpose of discharging output capacitances of the switches in the primary circuit to drive the switches to zero voltage during the dead time.

The improvement further comprises the step of coupling the current flowing through the secondary coil in the transformer through two output chokes having their opposing terminals coupled in common as one output of the secondary circuit. the secondary coil having no center tap.

The improvement also further comprises the step of inductively decoupling the primary coil of the transformer simultaneously with the step of capacitively decoupling the primary coil of the transformer to drive the switches within the primary circuit to zero voltage during the dead time.

The invention and its various embodiments may better be visualized by turning to the following drawings wherein like elements are referenced by like numerals.

The invention can now be understood by turning to the following detailed description.

DETAILED DESCRIPTION OF THE PREFERRED EMBODIMENTS

An improved power converter utilizing a full wave or half wave bridge circuit is provided by capacitively decoupling the primary winding of the transformer, which is coupled to the output of the bridge circuit. The switches in the bridge are also driven in a complementary fashion so that all the switches are turned off during a constant dead time during which the switches are driven to zero voltage. Switches in the bridge circuit are then turned on only at zero voltage. Zero voltage switching is further provided over a wider range of input and output conditions by providing a third switch in series circuit with a secondary winding of the transformer, typically either in the form of a saturable reactor or a synchronized switch. Further circuit advantages are obtained by deleting any center tap on the secondary winding and providing output chokes in series circuit with each terminal of the secondary winding and coupled at their opposing ends to one terminal of the output of the secondary circuit.

Figure 1:
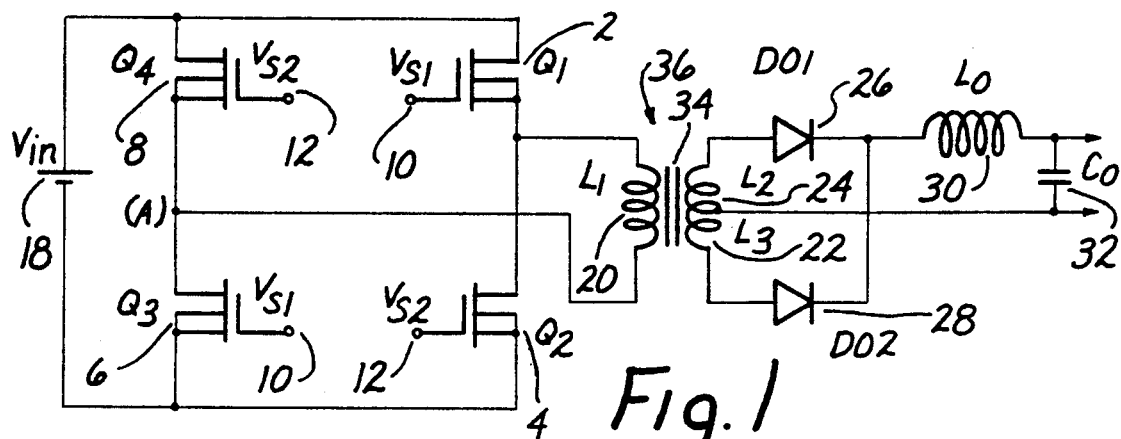
FIG. 1 is a schematic of a prior art bridge converter.
Figure 2:
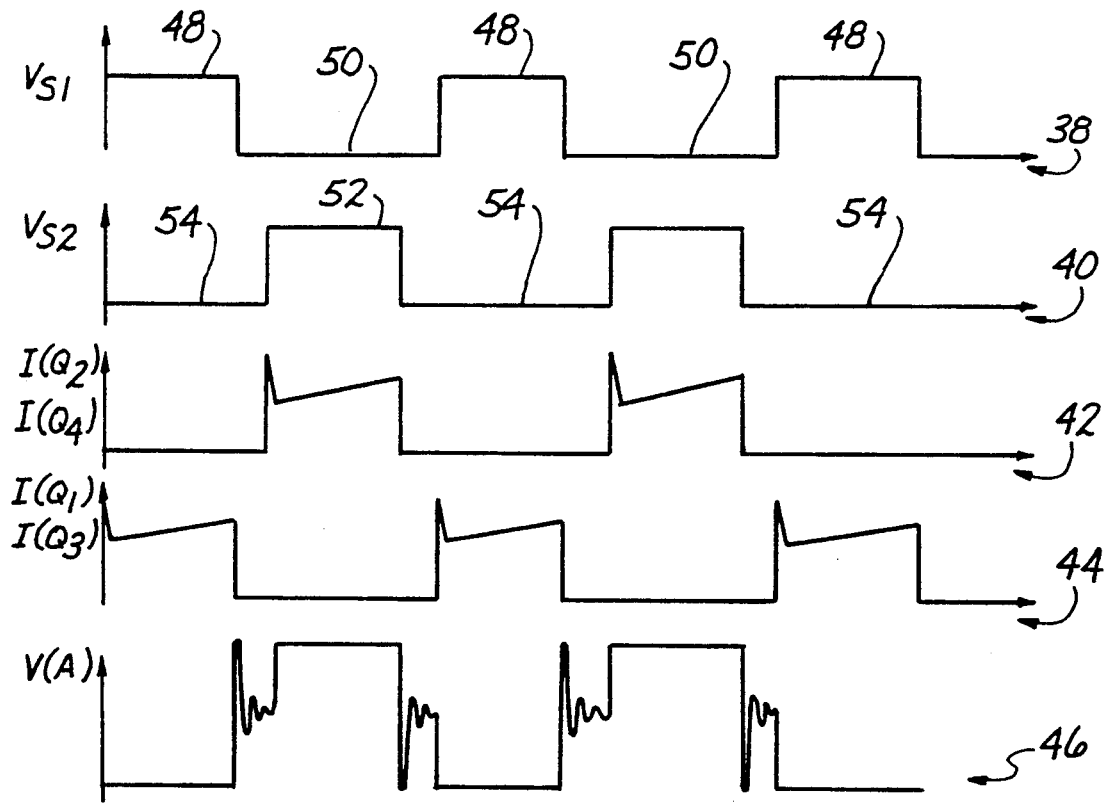
FIG. 2 is a wave diagram of the key waveforms of the prior art full bridge converter presented in FIG. 1.

The conventional full bridge converter, depicted in FIG. 1, presents several limitations, which does not allow efficient operation at very high frequency. One of the problems is switching losses when the output capacitance of the switch is discharged at turn on. The current spikes at the leading edge of the current through the switches 2, 4, 6, 8 are illustrated in the waveforms 42 and 44 of FIG. 2. The current spikes are created by the discharge of the output capacitance of the switches. The energy contained in leakage inductance of the transformer is not used, or totally recycled, and is dissipated in snubbing circuits. The ringing phenomenon in drain of the switches as shown in waveform 46 of FIG. 2 illustrates this last phenomenon.

Figure 3:
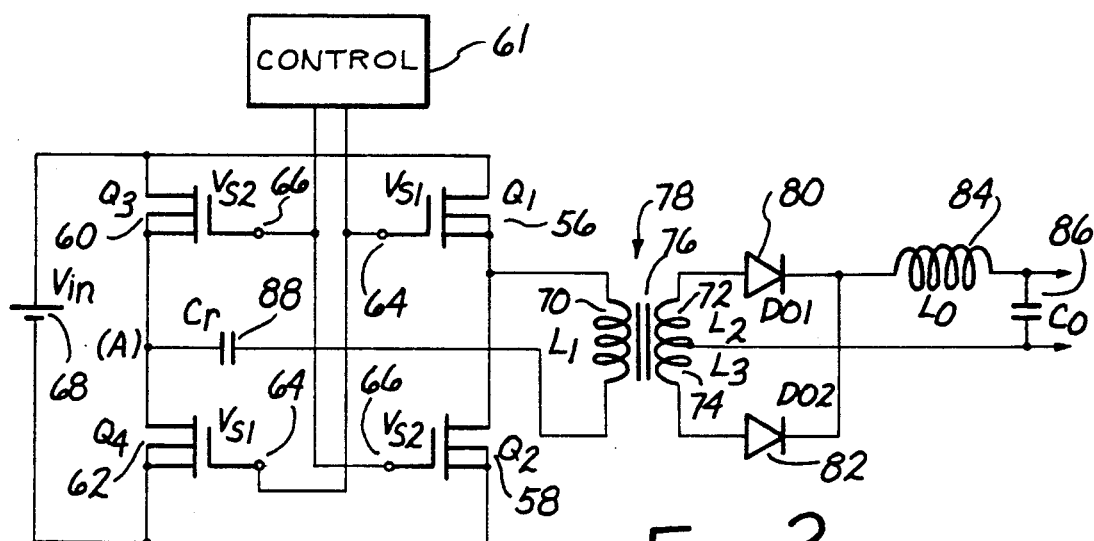
FIG. 3 is a schematic of the preferred embodiment of this invention, a full bridge converter with complementary switches which switches at zero voltage.
Figure 4:
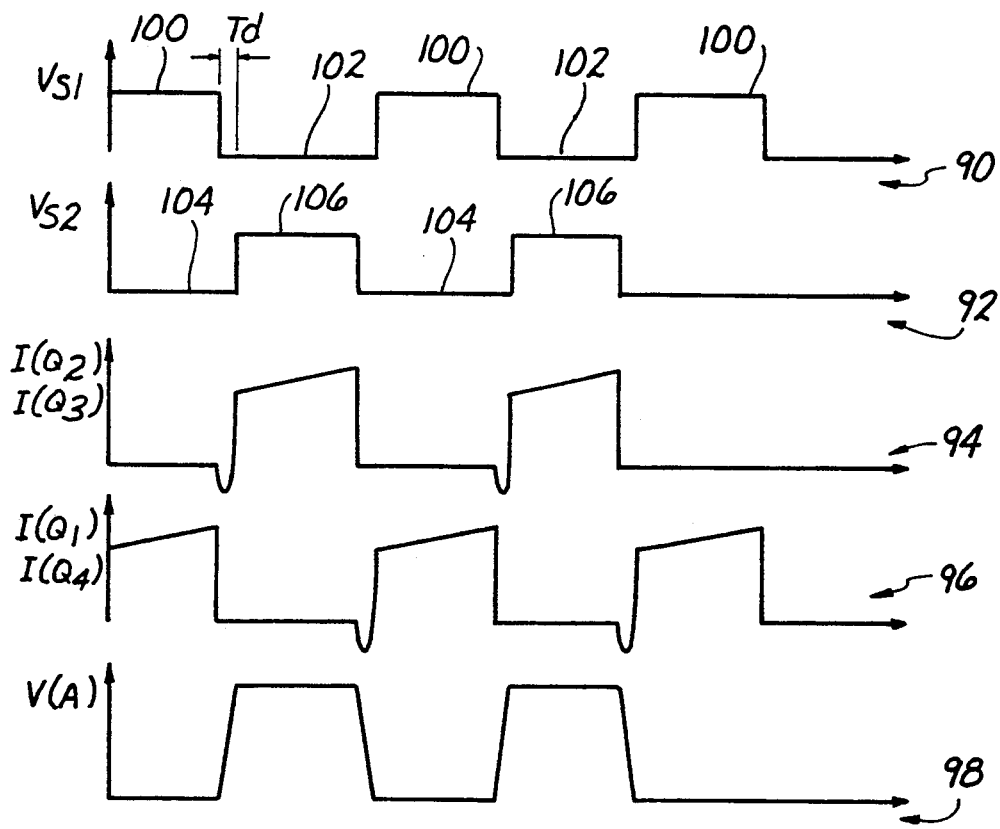
FIG. 4 is a wave diagram of the key waveforms of the converter presented in FIG. 3.

A full bridge converter is illustrated in FIG. 3 where primary winding 7 of the transformer 78 is decoupled by the capacitor 88, Cr. The major difference from the conventional full bridge converter is the driving waveforms, shown as waveforms 90 and 92 of FIG. 4. These waveforms may be applied to the gates of the FETs forming the switches in the preferred embodiment by any capable conventional means. For example, digitally controlled logic circuitry 61 can drive the switches to keep the dead time constant notwithstanding any variation in duty cycle. As the duty cycle of one set of switches 64 increases, the duty cycle for the complementary set of switches 66 decreases to keep the dead time constant in absolute magnitude and vice versa. The length of the dead time will depend on the range of operating frequencies and the circuit parameters, but it is chosen to allow all of the inherent capacitance in switches 64 and 66 to discharge to zero voltage during the dead time. As discussed below several techniques are disclosed which enhance the circuit's ability to discharge these capacitances thereby increasing the possible range of input operating conditions and frequencies of operation.

Each set of switches are driven by complementary waveforms with a constant dead time in between them. The transfer function is also different from conventional full bridge. The transfer function is:

$$V_o = 4D(1-D)(V_{in}/n),$$

where Vo is the output voltage, Vin the input voltage, n the turn ratio of the transformer, and D the duty cycle.

The voltage across the decoupling capacitor 88 is:

$$V_c = V_{in}(1-2D).$$

where Vc is the voltage across capacitor 88.

Starting from the consideration that field effect transistor (FET) 56, Q1, and FET 62, Q4, are conducting during D, their conduction duty cycle, the output rectifier 80, Do1, is conducting, transferring energy to the load. During the same time the current builds up in the magnetizing inductance of transformer 78. At the moment when switches or FET's 56 and 62 turn off, the magnetizing current and the current corresponding to the leakage inductance will continue to flow via output capacitance of switches FET 60, Q3, and FET 58, Q2. As result, those capacitances will be discharged. In this way, conditions are created for zero voltage switching for switches FET 60 and FET 58. The second set of switches FET 60 and FET 58 turn on at a zero voltage condition as shown in waveform 98, and the process continues. All switches are turned on at zero voltage conditions, when the energy contained in the magnetizing inductance and leakage inductance exceeds the energy accumulated in the output capacitances of the switches.

There are a number of techniques to guarantee zero voltage switching conditions under an increased range of input and output conditions. One of these techniques is to increase the amplitude of magnetizing current. This can be accomplished, for example, by decreasing the inductance of the primary winding of the transformer by decreasing the core gap distance. Unfortunately by using this approach, the losses associated with a large root mean square (RMS) current in primary 7 will decrease the efficiency of the converter.

Another techniques is to increase the leakage inductance, but this will affect the efficiency of the converter due to an increased amount of recycled energy. This can be accomplished, for example, increasing the distance between the primary and secondary windings in the transformer.

Another techniques, which is one of the embodiments of this invention, is to use a third switch in the secondary circuit in series with diode 80, Do1, which can be implemented as saturable reactor or a synchronized switch 171 as is depicted in FIG. 7. Synchronized switch 171 is controlled by logic circuitry 61 to that switch 171 is off during that portion of the dead time wherein the switches in the primary circuit are discharging to zero voltage. As soon as all the switches reach zero voltage, switch 171 is turned on. Control circuit 61 may thus include a feedback coupling (not shown) to the primary switches to detect coincidence of zero voltage crossing or discharge for all the switches.

Figure 5:
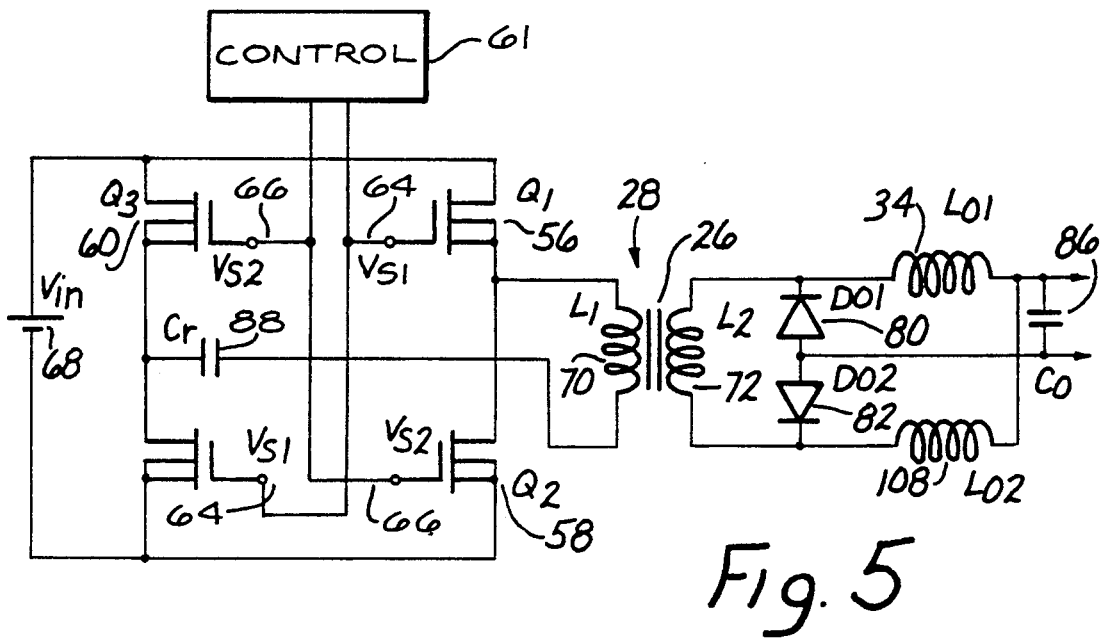
FIG. 5 is a schematic of an embodiment of this invention where the output of the full bridge does not have a center tapped output.

FIG. 5 shows a complementary switch full bridge converter without a center tapped secondary, and using two coupled inductors as an output choke. The elimination of the center tapped secondary significantly simplifies the complexity of transformer 78 and also reduces the losses in the transformer.

Figure 6A:
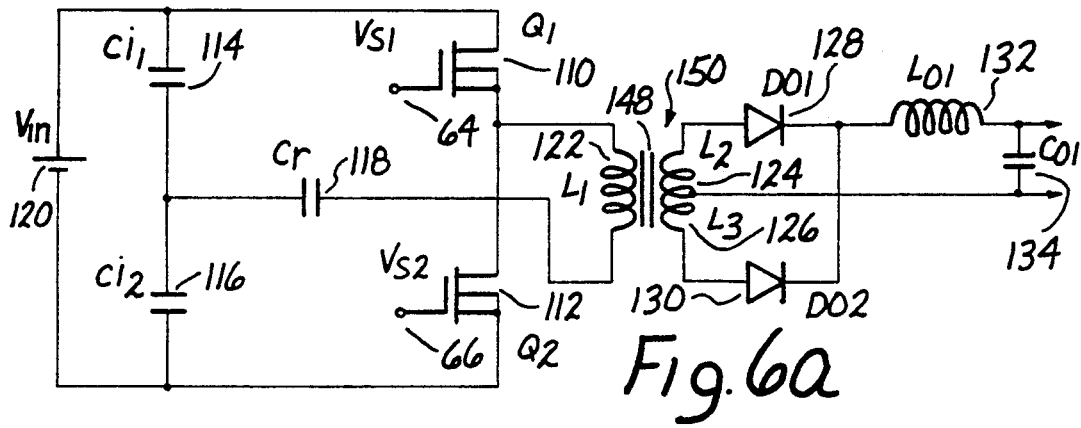
FIG. 6a is a schematic of a half bridge configuration using complementary switches, switching at zero voltage.

FIGS. 6a and b show a half bridge converter using a decoupling capacitor 118, Cr, in series with the primary winding. The control of the switches is done by using complementary waveforms with a constant dead time in between. The operation is similar to the full bridge converter, but the transfer function is described as:

$$V_o = 2D(1-D)(V_{in}/N).$$

Figure 6B:
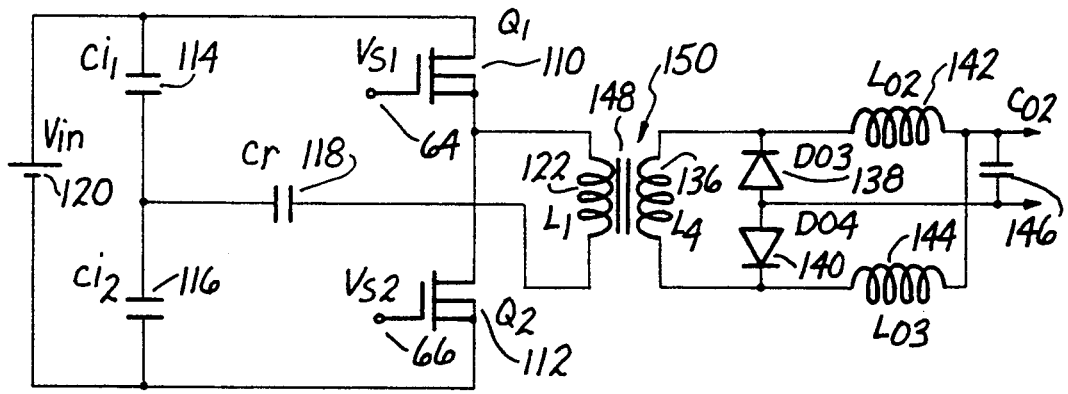
FIG. 6b is a schematic of a half bridge configuration using complementary switches as in FIG. 6a and where the secondary winding has no center tap.

During the conduction of switch FET 110, Q1, the energy is transferred to the secondary via diodes 128, D01, and 140, D04, during which time the magnetizing and leakage inductance energy is built up. At the moment when switch FET 110, Q1, ceases to conduct, the magnetizing current and the current flowing through the leakage inductance will continue to flow via the output capacitance of switch FET 112, Q2, until the output voltage across switch FET 112 reaches zero. At that moment, switch FET 112 is turned on, achieving zero voltage turn-on conditions. The secondary can be implemented by using a center tapped technique as shown in FIG. 6a, or a configuration created by secondary winding 136, diodes 138 and 140, inductors 142 and 144, and capacitor 106 as shown in FIG. 6b.

Figure 7A:
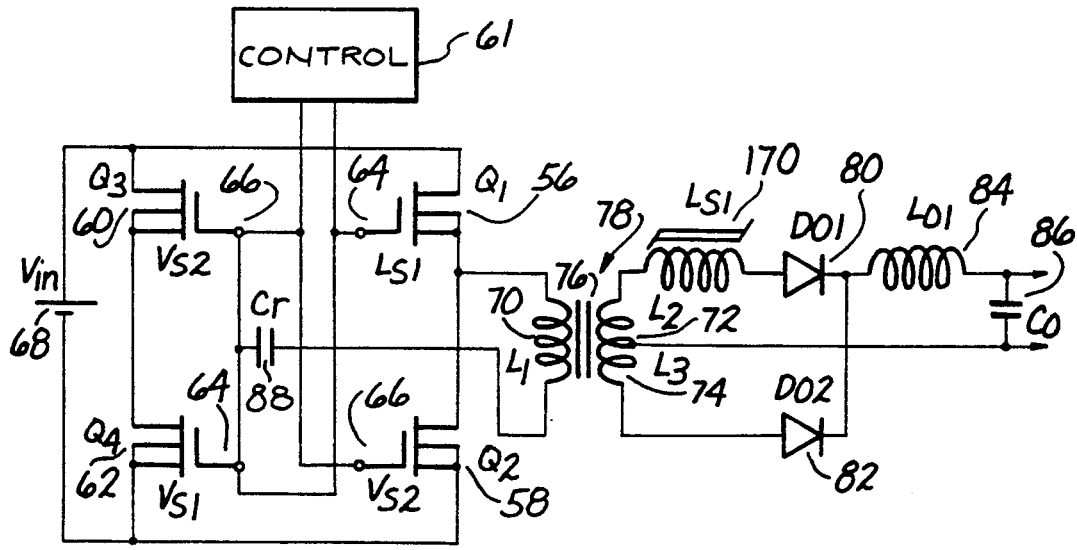
FIG. 7a is a schematic of another embodiment of this invention, where a third switch is implemented as saturable reactor and which is used to guarantee zero voltage switching over a large range of input and output conditions.
Figure 7B:
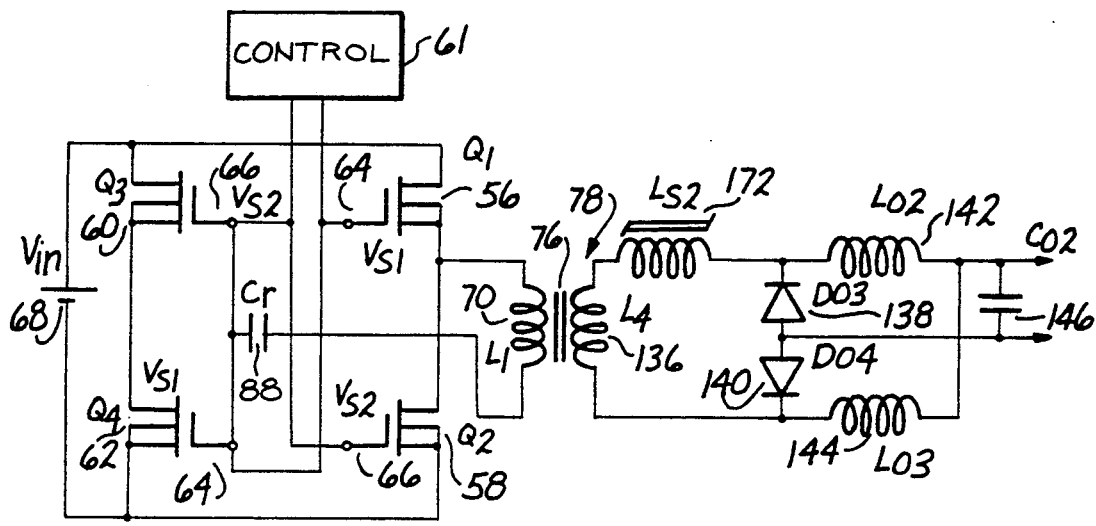
FIG. 7b is a schematic where a third switch is implemented as saturable reactor as in FIG. 7a and where the secondary winding has no center tap.
Figure 7C:
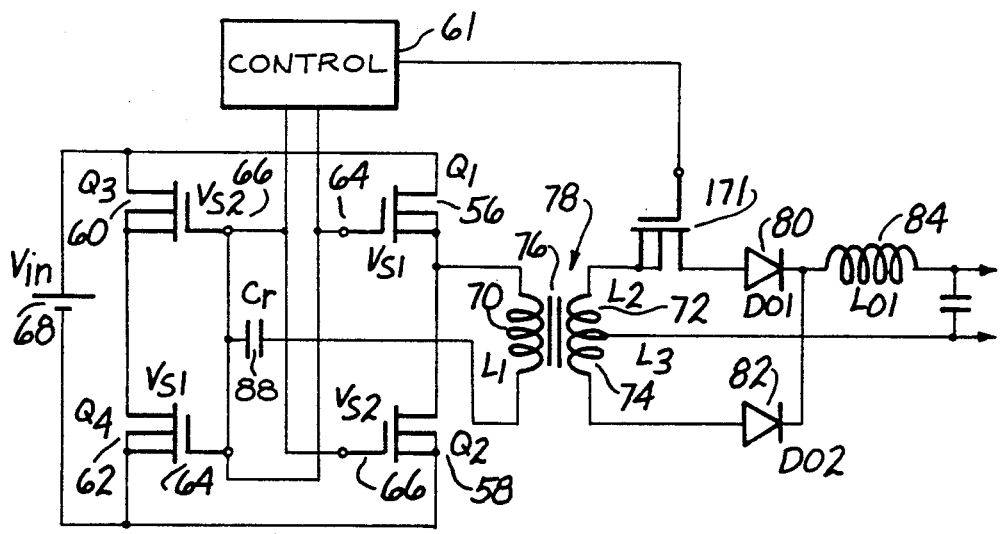
FIG. 7c is a schematic where a third switch is implemented as synchronized switch or transistor.
Figure 7D:
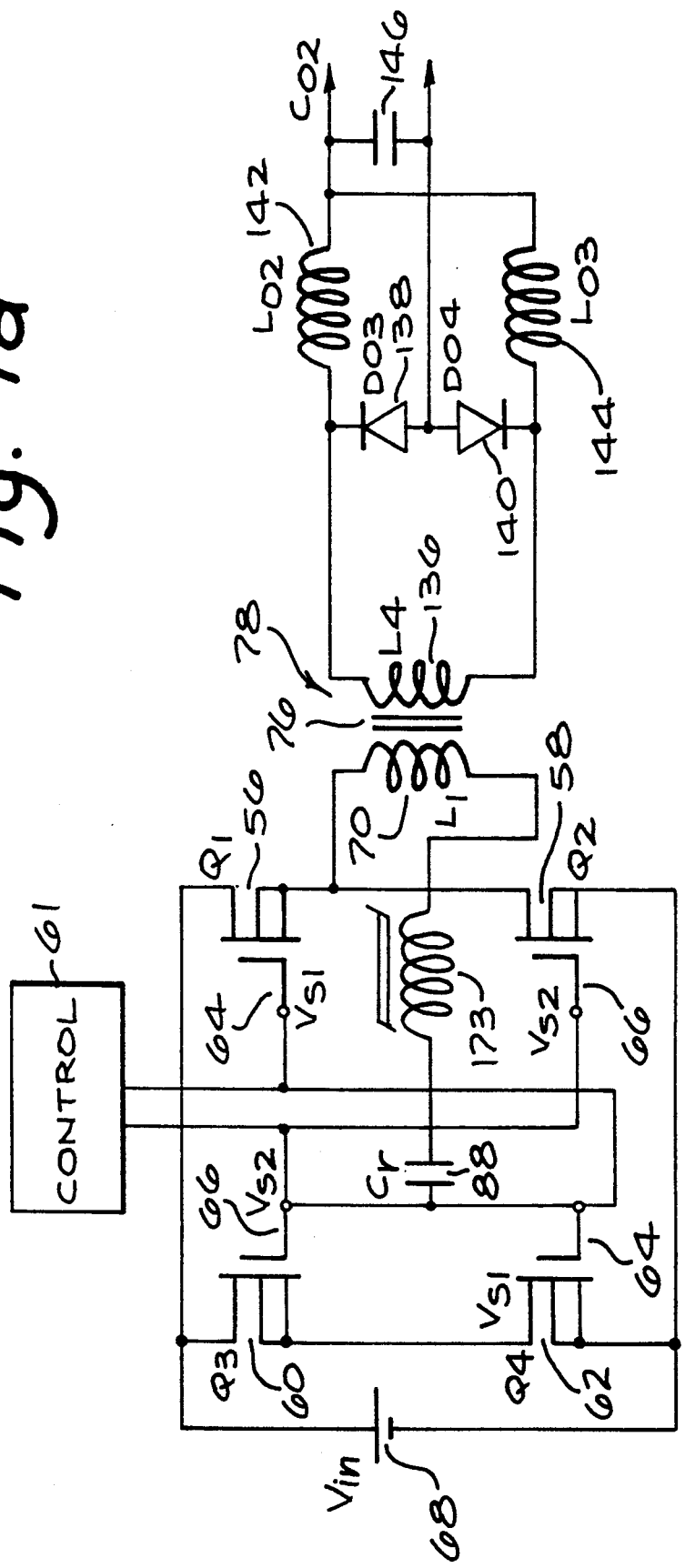
FIG. 7d is a schematic where a third switch is implemented by a saturable reactor in series with the decoupling capacitor and the primary coil.

A third switching technique of the invention, implemented as saturable reactor, is shown in FIGS. 7a, b and c, and includes reactor 170, Ls1, and reactor 172, Ls2. A third switch in the secondary circuit is necessary to obtain a zero voltage condition over an increased range of input and output conditions. In the embodiment of FIG. 7a the third switch in the secondary circuit is a saturable reactor. In the embodiment of FIG. 7b the saturable reactor is shown in a secondary circuit where the center tap on the secondary winding has been eliminated. In FIG. 7c the center tapped secondary winding of FIG. 7a is shown in combination with a synchronized switch 171 controlled by control circuit 61 to perform the equivalent function served by saturable reactor 172 in the embodiments of FIGS. 7a and b. The same effect can be obtained by using a saturable inductor or a discrete inductor in the primary circuit in series with the decoupling capacitor.

In conclusion, by adding a decoupling capacitor in series with the primary winding and by driving the switches (half bridge) or a set of switches (full bridge) with complementary signals, and by using a third switch, such as saturable reactor in the secondary circuit, zero voltage switching conditions are achieved for all of the switches. This will significantly increase the efficiency of the converter. At the same time, the operational frequency can be significantly increased, which allows a high power density. This a very advantageous technology for power ranges from approximately 200 W to 2000 W, where high efficiency and high power density is required.

It must be understood that many modifications can be made to the invention by techniques and methods now known or later discovered without departing from the spirit and scope of the invention. The invention has been described above only for the purposes of illustration and example and should not be limited by the specifically illustrated examples. The invention must therefore be construed as being defined by the following claims and not limited by the illustrated embodiments. The claims are further to be construed to include all equivalents for performing substantially similar functions whether or not now known.

We claim:

1. An improvement in a power converter bridge circuit having a power transformer having a magnetizing and leakage inductance with a primary winding and a secondary winding, said primary winding is are coupled to a primary circuit, said secondary winding is are coupled to a secondary circuit, said primary circuit comprising switches for switching current on and off through said primary winding, said switches having stray output capacitances, said secondary circuit is are configured for coupling to a load, said improvement comprising:

means for switching said switches in said primary circuit with complementary driving wave forms so that a constant dead time of predetermined duration, said dead time is are defined as a time interval when all said switches are turned off, is established even when the duty cycle of said switches varies and so that all of said switches switch at zero voltage; and a decoupling capacitor disposed in said primary circuit in series with said primary winding said decoupling capacitor is are sized to permit discharge of said stray output capacitances in said switches and said stray magnetizing and leakage inductance in said transformer during said predetermined constant dead time, said predetermined constant dead time is are defined as having a duration beginning from when said switches are all off until the energy stored in said magnetizing and leakage inductance in said transformer exceeds the energy stored said stray output capacitances of said switches, said primary circuit forming a rectifying bridge, so that the frequency of operation and power densities of said converter is substantially increased as compared to converter bridge circuits without said improvement.

2. The improvement of claim 1 wherein said bridge circuit is a full wave rectifying bridge.

3. The improvement of claim 1 wherein said rectifying circuit is a half wave rectifying bridge.

4. The improvement of claim 2 wherein said full wave bridge has input terminals and output terminals, said decoupling capacitor being coupled in series with said primary winding of the said transformer and said series combination of said primary winding and decoupling capacitor being coupled across said output terminals of said full wave bridge.

5. An improvement in a power converter bridge circuit having a power transformer with a primary winding and a secondary winding, said primary winding is are coupled to a primary circuit, said secondary winding is are coupled to a secondary circuit, said primary circuit comprising switches for switching current on and off through said primary winding, said secondary circuit is are configured for coupling to a load, said improvement comprising:

means for switching said switches in said primary circuit with complementary driving wave forms so that a constant dead time, defined as a time interval when all said switches are turned off, is established even when the duty cycle of said switches varies and so that all of said switches switch at zero voltage; and a decoupling capacitor disposed in said primary circuit in series with said primary winding, said primary circuit forming a rectifying bridge, so that the frequency of operation and power densities of said converter is substantially increased as compared to converter bridge circuits without said improvement, means for increasing magnetizing current within said primary winding of said transformer to guarantee zero voltage switching conditions of said switches in said primary circuit for an increased range of input and output conditions of said converter.

6. An improvement in a power converter bridge circuit having a power transformer with a primary winding and a secondary winding, said primary winding being coupled to a primary circuit, said secondary winding being coupled to a secondary circuit, said primary circuit comprising switches for switching current on and off through said primary winding, said secondary circuit being configured for coupling to a load, said improvement comprising:

means for switching said switches in said primary circuit with complementary driving wave forms so that a constant dead time, defined as a time interval when all said switches are turned off, is established even when the duty cycle of said switches varies and so that all of said switches switch at zero voltage;

a decoupling capacitor disposed in said primary circuit in series with said primary winding, said primary circuit forming a rectifying bridge, so that the frequency of operation and power densities of said converter is substantially increased as compared to converter bridge circuits without said improvement; and means for increasing leakage inductance of said primary winding of said transformer to guarantee zero voltage switching conditions of said switches in said primary circuit for an increased range of input and output conditions.

7. An improvement in a power converter bridge circuit having a power transformer with a primary winding and a secondary winding, said primary winding being coupled to a primary circuit, said secondary winding being coupled to a secondary circuit, said primary circuit comprising switches for switching current on and off through said primary winding, said secondary circuit being configured for coupling to a load, said improvement comprising:

means for switching said switches in said primary circuit with complementary driving wave forms so that a constant dead time, defined as a time interval when all said switches are turned off, is established even when the duty cycle of said switches varies and so that all of said switches switch at zero voltage;

a decoupling capacitor disposed in said primary circuit in series with said primary winding, said primary circuit forming a rectifying bridge, so that the frequency of operation and power densities of said converter is substantially increased as compared to converter bridge circuits without said improvement; and switching means disposed in said secondary circuit to guarantee zero voltage switching conditions in said primary circuit for an increased range of input and output conditions.

8. The improvement of claim 1 wherein said transformer has a center tap and an inductive choke in series circuit in said secondary circuit with said load.

9. An improvement in a power converter bridge circuit having a power transformer with a primary winding and a secondary winding, said primary winding being coupled to a primary circuit, said secondary winding being coupled to a secondary circuit, said primary circuit comprising switches for switching current on and off through said primary winding, said secondary circuit being configured for coupling to a load, said improvement comprising:

means for switching said switches in said primary circuit with complementary driving wave forms so that a constant dead time, defined as a time interval when all said switches are turned off, is established even when the duty cycle of said switches varies and so that all of said switches switch at zero voltage; and a decoupling capacitor disposed in said primary circuit in series with said primary winding, said primary circuit forming a rectifying bridge, so that the frequency of operation and power densities of said converter is substantially increased as compared to converter bridge circuits without said improvement, wherein said secondary circuit comprises two output chokes coupled in series circuit with said secondary winding of said transformer, opposing ends of said output chokes coupled in common to the output of said secondary circuit, said secondary winding being without any center tap.

10. The improvement of claim 7 wherein said switching means is a saturable reactor.

11. The improvement of claim 7 wherein said switching means is a synchronized switch.

12. An improvement in a power converter bridge circuit having a power transformer with a primary winding and a secondary winding, said primary winding being coupled to a primary circuit, said secondary winding being coupled to a secondary circuit, said primary circuit comprising switches for switching current on and off through said primary winding, said secondary circuit being configured for coupling to a load, said improvement comprising:

means for switching said switches in said primary circuit with complementary driving wave forms so that a constant dead time, defined as a time interval when all said switches are turned off, is established even when the duty cycle of said switches varies and so that all of said switches switch at zero voltage;

a decoupling capacitor disposed in said primary circuit in series with said primary winding, said primary circuit forming a rectifying bridge, so that the frequency of operation and power densities of said converter is substantially increased as compared to converter bridge circuits without said improvement; and an inductor in series circuit with said decoupling capacitor in said primary circuit to guarantee zero voltage switching of said switches in said primary circuit over an increased range of input and output conditions.

13. The improvement of claim 12 wherein said inductor is a saturable reactor.

14. The improvement of claim 12 wherein said inductor is a discrete inductor.

15. An improvement in a method for providing bridge rectification in a power circuit including a bridge rectifier having stray output capacitances coupled to a primary coil of a transformer having a magnetizing and leakage inductance, said transformer having a secondary coil coupled to a secondary circuit for coupling to a load, said improvement comprising the steps of:

driving said switches in said bridge with complementary timing so that there is a predetermined constant dead time during which all switches within said primary circuit are turned off even when the duty cycle of said switches varies; and discharging of said stray output capacitance in said bridge rectifier and said stray magnetizing and leakage inductance in said transformer during said predetermined constant dead time through a decoupling capacitor coupled between said primary coil and said bridge, said predetermined constant dead time being defined as having a duration beginning from when said bridge rectifier is entirely off until the energy stored in said magnetizing and leakage inductance in said transformer exceeds the energy stored said stray output capacitances of said bridge rectifier, so that the frequency of operation and power densities of said converter is substantially increased as compared to converter bridge circuits without said improvement.

16. The improvement of claim 15 further comprising the step of switching each of said switches in said primary circuit at zero voltage.

17. An improvement in a method for providing bridge rectification in power circuit including a bridge rectifier coupled to a primary coil of a transformer, said transformer having a secondary coil coupled to a secondary circuit for coupling to a load, said improvement comprising the steps of:

driving said switches in said bridge with complementary timing so that there is a dead time during which all switches within said primary circuit are turned off even when the duty cycle of said switches varies;

capacitively decoupling said primary coil from said bridge; and switching each of said switches in said primary circuit at zero voltage, where said step of switching comprises the step of blocking flow of current in the secondary circuit coupled through secondary coil of said transformer through said primary circuit to inhibit loss of magnetizing energy from said primary coil until capacitance of said switches in said primary circuit have been discharged by said magnetizing energy in said primary coil.

18. An improvement in a method for providing bridge rectification in a power circuit including a bridge rectifier coupled to a primary coil of a transformer, said transformer having a secondary coil coupled to a secondary circuit for coupling to a load, said improvement comprising the steps of:

driving said switches in said bridge with complementary timing so that there is a dead time during which all switches within said primary circuit are turned off even when the duty cycle of said switches varies;

capacitively decoupling said primary coil from said bridge; and switching each of said switches in said primary circuit at zero voltage, wherein said step of switching further comprises the step of providing an increased inductance in said primary coil of said transformer to increase magnetizing inductance and leakage inductance therein for the purpose of discharging output capacitances of said switches in said primary circuit to drive said switches to zero voltage during said dead time.

19. An improvement in a method for providing bridge rectification in a power circuit including a bridge rectifier coupled to a primary coil of a transformer, said transformer having a secondary coil coupled to a secondary circuit for coupling to a load, said improvement comprising the steps of:

driving said switches in said bridge with complementary timing so that there is a dead time during which all switches within said primary circuit are turned off even when the duty cycle of said switches varies;

capacitively decoupling said primary coil from said bridge; and coupling the current flowing through the said secondary coil in said transformer through two output chokes having their opposing terminals coupled in common as one output of said secondary circuit, said secondary coil having no center tap.

20. An improvement in a method for providing bridge rectification in a power circuit including a bridge rectifier coupled to a primary coil of a transformer, said transformer having a secondary coil coupled to a secondary circuit for coupling to a load, said improvement comprising the steps of:

driving said switches in said bridge with complementary timing so that there is a dead time during which all switches within said primary circuit are turned off even when the duty cycle of said switches varies;

capacitively decoupling said primary coil from said bridge; and inductively decoupling said primary coil of said transformer simultaneously with said step of capacitively decoupling said primary coil of said transformer to drive said switches within said primary circuit to zero voltage during said dead time.

* * * * *